US009582135B2

(12) United States Patent
Holler et al.

(10) Patent No.: US 9,582,135 B2
(45) Date of Patent: Feb. 28, 2017

(54) MULTIPLE DISPLAY MODES FOR A PANE IN A GRAPHICAL USER INTERFACE

(71) Applicant: VERSIONONE, INC., Alpharetta, GA (US)

(72) Inventors: Robert Holler, Cumming, GA (US); Ian Culling, Cumming, GA (US); Rajiv Delwadia, Woodstock, GA (US); Pavel Mamut, Buford, GA (US); Mark Crowe, Kula, HI (US); Donald Hanson, Cumming, GA (US); Patrick Boudreaux, Cumming, GA (US); Dan Gilkerson, San Diego, CA (US); Julie Brooks, Washington, DC (US); Eric Farr, Alpharetta, GA (US); Jerry Odenwelder, Atlanta, GA (US)

(73) Assignee: VERSIONONE, INC., Alpharetta, GA (US)

( * ) Notice: Subject to any disclaimer, the term of this patent is extended or adjusted under 35 U.S.C. 154(b) by 493 days.

(21) Appl. No.: 13/890,179

(22) Filed: May 8, 2013

(65) Prior Publication Data

US 2013/0246966 A1  Sep. 19, 2013

Related U.S. Application Data

(63) Continuation of application No. 12/247,963, filed on Oct. 8, 2008, now Pat. No. 8,453,067.

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 3/048* (2013.01); *G06F 3/0482* (2013.01); *G06F 3/04847* (2013.01)

(58) Field of Classification Search
CPC ...... G06F 3/048; G06F 3/0481; G06F 3/0482; G06F 3/04847
(Continued)

(56) References Cited

U.S. PATENT DOCUMENTS 5,544,300 A    8/1996 Skarbo et al.
5,714,971 A    2/1998 Shalit et al.
(Continued)

OTHER PUBLICATIONS

Holler, Notice of Allowance, U.S. Appl. No. 12/357,225, Jun. 20, 2014, 12 pgs.
(Continued)

*Primary Examiner* — William Bashore
*Assistant Examiner* — Gregory A Distefano
(74) *Attorney, Agent, or Firm* — Morgan, Lewis & Bockius LLP

(57) ABSTRACT

Systems and methods for providing multiple display modes for a pane in a graphical user interface are provided. In some implementations, a computer-implemented method for displaying a pane in a user interface, includes: in a first display mode: displaying the pane in the user interface, wherein display of the pane persists regardless of a position of a pointer icon in the user interface; and ceasing to display the pane in response to detecting selection of an indicator; and in a second display mode: displaying the pane in the user interface, wherein display of the pane persists while the pointer icon is positioned over the indicator or within the perimeter of the pane; and ceasing to display the pane in response to detecting that the pointer icon is no longer positioned over the indicator or within the perimeter of the pane.

18 Claims, 8 Drawing Sheets

(51) Int. Cl.
*G06F 3/0484* (2013.01)
*G06F 3/0482* (2013.01)

(58) Field of Classification Search
USPC .................................................. 715/764, 779
See application file for complete search history.

(56) References Cited

U.S. PATENT DOCUMENTS

| | | | |
|---|---|---|---|
| 5,874,958 A * | 2/1999 | Ludolph ...................... | 715/781 |
| 5,943,053 A | 8/1999 | Ludolph et al. | |
| 5,956,030 A | 9/1999 | Conrad et al. | |
| 6,175,364 B1 | 1/2001 | Wong et al. | |
| 6,211,874 B1 | 4/2001 | Himmel | |
| 6,239,798 B1 | 5/2001 | Ludolph et al. | |
| 6,694,009 B1 | 2/2004 | Anderson et al. | |
| 6,698,013 B1 | 2/2004 | Bertero et al. | |
| 6,850,255 B2 | 2/2005 | Muschetto | |
| 7,051,038 B1 | 5/2006 | Yeh et al. | |
| 7,117,447 B2 | 10/2006 | Cobb et al. | |
| 7,210,093 B1 | 4/2007 | Dutta | |
| 7,236,966 B1 | 6/2007 | Jackson et al. | |
| 7,272,815 B1 | 9/2007 | Eldridge et al. | |
| 7,376,891 B2 | 5/2008 | Hitchock et al. | |
| 7,415,677 B2 | 8/2008 | Arend et al. | |
| 7,421,648 B1 | 9/2008 | Davis | |
| 7,478,338 B2 * | 1/2009 | Yanchar et al. ............... | 715/773 |
| 7,490,314 B2 | 2/2009 | Yuknewicz et al. | |
| 7,640,496 B1 | 12/2009 | Chaulk et al. | |
| 7,644,390 B2 | 1/2010 | Khodabandehloo et al. | |
| 7,899,694 B1 | 3/2011 | Marshall et al. | |
| 7,930,201 B1 | 4/2011 | Issa et al. | |
| 8,042,063 B1 | 10/2011 | Lin-Hendel | |
| 8,370,803 B1 | 2/2013 | Holler et al. | |
| 8,561,012 B1 | 10/2013 | Holler | |
| 8,751,491 B2 | 6/2014 | Fitzmaurice | |
| 8,863,107 B2 | 10/2014 | Krivopaltsev | |
| 9,129,240 B2 | 9/2015 | Holler | |
| 2002/0062367 A1 | 5/2002 | Debber et al. | |
| 2002/0089526 A1 | 7/2002 | Buxton et al. | |
| 2002/0091732 A1 | 7/2002 | Pedro | |
| 2002/0138636 A1 | 9/2002 | Buttner | |
| 2003/0033589 A1 | 2/2003 | Reyna et al. | |
| 2003/0046282 A1 | 3/2003 | Carlson et al. | |
| 2003/0061330 A1 | 3/2003 | Frisco et al. | |
| 2003/0103079 A1 * | 6/2003 | Adatia et al. ................. | 345/762 |
| 2003/0158845 A1 | 8/2003 | Braley | |
| 2003/0160815 A1 | 8/2003 | Muschetto | |
| 2003/0163404 A1 | 8/2003 | Hu et al. | |
| 2003/0172020 A1 | 9/2003 | Davies et al. | |
| 2003/0182470 A1 | 9/2003 | Carlson et al. | |
| 2003/0182652 A1 | 9/2003 | Custodio | |
| 2003/0188290 A1 | 10/2003 | Corral | |
| 2003/0204644 A1 | 10/2003 | Vincent | |
| 2004/0081951 A1 | 4/2004 | Vigue et al. | |
| 2004/0186762 A1 | 9/2004 | Beaven et al. | |
| 2004/0243457 A1 | 12/2004 | D'Andrea et al. | |
| 2004/0243968 A1 | 12/2004 | Hecksel | |
| 2004/0268246 A1 | 12/2004 | Leban et al. | |
| 2005/0004825 A1 | 1/2005 | Ehrler et al. | |
| 2005/0065951 A1 | 3/2005 | Liston et al. | |
| 2005/0086239 A1 | 4/2005 | Swann et al. | |
| 2005/0086638 A1 | 4/2005 | Farn | |
| 2005/0114829 A1 | 5/2005 | Robin et al. | |
| 2005/0114830 A1 | 5/2005 | Knutson et al. | |
| 2005/0125771 A1 | 6/2005 | Vitanov | |
| 2005/0132048 A1 | 6/2005 | Kogan et al. | |
| 2005/0198615 A1 | 9/2005 | Choi et al. | |
| 2005/0216879 A1 | 9/2005 | Ruhe | |
| 2005/0229157 A1 | 10/2005 | Johnson | |
| 2006/0036973 A1 | 2/2006 | Ogami | |
| 2006/0069604 A1 * | 3/2006 | Leukart et al. ................ | 705/9 |
| 2006/0123389 A1 | 6/2006 | Kolawa et al. | |
| 2006/0212327 A1 | 9/2006 | Norman | |
| 2006/0235771 A1 | 10/2006 | Oberoi | |
| 2006/0236261 A1 * | 10/2006 | Forstall et al. ............... | 715/784 |
| 2007/0033567 A1 | 2/2007 | Carlson et al. | |
| 2007/0094609 A1 | 4/2007 | Gilboa et al. | |
| 2007/0124682 A1 | 5/2007 | Fukeda et al. | |
| 2007/0168918 A1 | 7/2007 | Metherall et al. | |
| 2007/0288292 A1 | 12/2007 | Gauger | |
| 2008/0077416 A1 | 3/2008 | Hetrick | |
| 2008/0077530 A1 | 3/2008 | Banas et al. | |
| 2008/0097734 A1 | 4/2008 | Raffo | |
| 2008/0154749 A1 | 6/2008 | D'hooghe et al. | |
| 2008/0172625 A1 | 7/2008 | Montgomery | |
| 2008/0282228 A1 | 11/2008 | Subramanyam | |
| 2008/0301296 A1 | 12/2008 | York | |
| 2009/0024647 A1 | 1/2009 | Hein | |
| 2009/0204465 A1 | 8/2009 | Pradhan | |
| 2009/0271760 A1 | 10/2009 | Ellinger | |
| 2009/0300580 A1 | 12/2009 | Heyhoe et al. | |
| 2010/0088664 A1 | 4/2010 | Khodabandehloo et al. | |
| 2010/0218092 A1 | 8/2010 | Xiang et al. | |
| 2010/0306730 A9 | 12/2010 | Carlson et al. | |
| 2015/0089448 A1 | 3/2015 | King | |

OTHER PUBLICATIONS

Holler, Office Action, U.S. Appl. No. 13/858,819, Nov. 18, 2013, 10 pgs.
Holler, Office Action, U.S. Appl. No. 12/101,089, Nov. 20, 2014, 16 pgs.
Chou, Redesigning a large and complex website: how to begin and a method for success, ACM, Providence, RI, Nov. 20-23, 2002, pp. 22-28.
Holler, Final Office Action, U.S. Appl. No. 12/101,089, Mar. 12, 2014, 16 pgs.
Holler, Notice of Allowance, U.S. Appl. No. 12/016,191, Jan. 15, 2014, 7 pgs.
Holler, Notice of Allowance, U.S. Appl. No. 12/245,566, Nov. 26, 2013, 11 pgs.
Holler, Notice of Allowance, U.S. Appl. No. 13/858,819, Apr. 3, 2014, 8 pgs.
Holler, Office Action, U.S. Appl. No. 12/357,225, Oct. 3, 2013, 29 pgs.
Ouimet, SERT: Software Tool for Generating Student Engagement Reports, IEEE, ITNG'07, 2007, 8 pgs.
Phan et al., Progressive Multiples for Communication-Minded Visualization, ACM, Montreal, Canada, May 28-30, 2007, pp. 225-232.
Ribarsky et al., Glyphmaker: Creating Customized Visualizations of Complex Data, IEEE, Jul. 1994, pp. 57-64.
Shih et al., Using URLs and Table Layout for Web Classification Tasks, ACM, New York, NY, May 17-22, 2004, pp. 193-202.
Sneed, Reengineering Reports, IEEE, WRCE'04, 2004, 11 pgs.
Holler, Office Action, U.S. Appl. No. 12/016,191, Jun. 19, 2013, 13 pgs.
Holler, Office Action, U.S. Appl. No. 12/101,089, Jun. 20, 2013, 13 pgs.
Holler Office Action, U.S. Appl. No. 12/101,084, Jun. 21, 2013, 14 pgs.
Akerman, Using Ontology to Support Development of Software Architectures, 2006, 13 pgs.
Ayewah, Evaluating Status Analysis Defect Warnings on Production Software, 2007, 7 pgs.
Barton, Reporting Scrum Project Progress to Executive Management Through Metrics, Jan. 2005, 9 pgs.
Boehm, A View of 20th and 21st Century Software Engineering, 2006, 18 pgs.
Cause, Delivering Real Business Value Using FDD, Winter 2004, 13 pgs.
Ceschi, Project Management in Plan-Based and Agile Companies, 2005, 7 pgs.
CruiseControl, http://www.cruisecontrol.sourceforge.net/overview.html, Apr. 9, 2010, 1 pg.
CruiseControl, http://www.cruisecontrol.sourceforge.net/overview.html, Apr. 9, 2010, 34 pgs.
Danube Technologies, ScrumWorks Pro Documentation Web Client User Guide, Feb. 2007, 7 pgs.

(56) References Cited

OTHER PUBLICATIONS

Danube Technologies, ScrumWorks Quick Start Guide, v.1.4.2, Jan. 2006, 10 pgs.
Danube Technologies, ScrumWorks Web Client User Guide, v.1.4. 2., Jan. 2006, 6 pgs.
DeLuca, FDD implementations, Nov. 2005, 10 pgs.
DeLuca, Parking Lot Chart—Aesthetics, Mar. 16, 2007, 2 pgs.
DeLuca, Parking Lot Chart Example 1, Dec. 17, 2003, 2 pgs.
DeLuca, Parking Lot Chart Example 2, Nov. 20, 2003, 1 pg.
DeLuca, Parking Lot Chart—Legend, Mar. 16, 2007, 2 pgs.
Derby, Agile Retrospectives, The Pragmatic Bookshelf, 2006, entire book, 186 pgs.
Fowler, The New Methodology, Dec. 13, 2005, 19 pgs.
Holler, Notice of Allowance, U.S. Appl. No. 12/016,192, Sep. 28, 2012, 8 pgs.
Holler, Notice of Allowance, U.S. Appl. No. 12/247,963, Jan. 30, 2013, 8 pgs.
Holler, Office Action, U.S. Appl. No. 12/016,191, Nov. 12, 2010, 10 pgs.
Holler, Office Action, U.S. Appl. No. 12/016,191, Dec. 16, 2011, 13 pgs.
Holler, Office Action, U.S. Appl. No. 12/016,191, Jul. 19, 2012, 12 pgs.
Holler, Office Action, U.S. Appl. No. 12/016,191, May 27, 2011, 16 pgs.
Holler, Office Action, U.S. Appl. No. 12/016,192, Nov. 18, 2011 10 pgs.
Holler, Office Action, U.S. Appl. No. 12/016,192, Apr. 26, 2011, 11 pgs.
Holler, Office Action, U.S. Appl. No. 12/016,192, Apr. 30, 2012, 12 pgs.
Holler, Office Action, U.S. Appl. No. 12/016,193, Jul. 9, 2012, 10 pgs.
Holler, Office Action, U.S. Appl. No. 12/016,193, Jan. 30, 2013, 13 pgs.
Holler, Office Action, U.S. Appl. No. 12/101,084, Feb. 18, 2011, 14 pgs.
Holler, Office Action, U.S. Appl. No. 12/101,084, Aug. 26, 2011, 17 pgs.
Holler, Office Action, U.S. Appl. No. 12/101,089, Jan. 9, 2012, 11 pgs.
Holler, Office Action, U.S. Appl. No. 12/101,089, May 23, 2012, 16 pgs.
Holler, Office Action, U.S. Appl. No. 12/174,511, Jan. 4, 2013, 23 pgs.
Holler, Office Action, U.S. Appl. No. 12/174,511, Nov. 10, 2011, 18 pgs.
Holler, Office Action, U.S. Appl. No. 12/174,511, May 11, 2012, 21 pgs.
Holler, Office Action, U.S. Appl. No. 12/245,566, May 14, 2012, 15 pgs.
Holler, Office Action, U.S. Appl. No. 12/245,566, Apr. 24, 2013, 17 pgs.
Holler, Office Action, U.S. Appl. No. 12/245,566, Nov. 30, 2012, 16 pgs.
Holler, Office Action, U.S. Appl. No. 12/247,939, Jun. 7, 2012, 9 pgs.
Holler, Office Action, U.S. Appl. No. 12/247,939, Nov. 19, 2012, 9 pgs.
Holler, Office Action, U.S. Appl. No. 12/247,939, Apr. 26, 2013, 5 pgs.
Holler, Office Action, U.S. Appl. No. 12/247,963, Jul. 9, 2012, 23 pgs.
Holler, Office Action, U.S. Appl. No. 12/247,963, Mar. 15, 2012, 20 pgs.
Holler, Office Action, U.S. Appl. No. 12/247,963, Jun. 30, 2011, 18 pgs.
Holler, Office Action, U.S. Appl. No. 12/357,225, Jul. 19, 2012, 28 pgs.
Holler, Office Action, U.S. Appl. No. 12/357,225, Nov. 23, 2012, 30 pgs.
IBM / Cognos Software, Budgeting and Forecasting Software, Jun. 2, 2009, 3 pgs.
JetBrains, Distributed Build Management and Continuous Integration Server, Apr. 9, 2010, 2 pgs.
JetBrains, Distributed Build Management and Continuous Integration Server: Features, Apr. 9, 2010, 2 pgs.
JetBrains, TeamCity 3.0-Overview, Jun. 28, 2010, 8 pgs.
JetBrains, TeamCity 4.5, 2003-2009, 2 pgs.
Kolcz, Using SPEM/UML Profile to Specification of IS Development Processes, Oct. 2006, 68 pgs.
Li, Empirical Evaluation of Defect Projection Models for Widely-deployed Production Software Systems, 2004, 10 pgs.
Lyu, Software Reliability Engineering: A Roadmap, 2007, 18 pgs.
Microsoft Office Online, Demo: Base Sales Forecasts and Trendlines on Data, Jun. 2, 2009, 3 pgs.
Microsoft Office Online, Demo: Check that hunch with Excel what-if scenarios, Jun. 2, 2009, 1 pg.
Microsoft Office Online, Show trends and forecast sales with charts, Jun. 2, 2009, 7 pgs.
Microsoft Office Online, Understanding Scheduling in Microsoft Project 2002, Jun. 2, 2009, 7 pgs.
Mountain Goat Software, Training for Scrum task board use, 1998-2010, 5 pgs.
Netsuite, Standard & Advanced Sales Forecasting Software, 1999, 6 pgs.
Odenwelder, Notice of Allowance, U.S. Appl. No. 12/463,299, Dec. 4, 2012, 13 pgs.
Odenwelder, Office Action, U.S. Appl. No. 12/463,299, Apr. 25, 2012, 18 pgs.
Robbins, Adopting Open Source Software Engineering Practices by Adopting OSSE Tools, 2005, 16 pgs.
Sandler, Source Control in Ten Minutes: A Subversion Tutorial, Jan. 24, 2006, 6 pgs.
Screenshot of Xplanner Date, 1 pg.
Sugarcrm, Sugarsuite Screenshot, Apr. 8, 2010, 1 pg.
Vanguard Software, Forecasting software, Jun. 2, 2009, 4 pgs.
VersionOne, Exhibits A&B, Figures 1&2, May 31, 2007, 2 pgs.
VersionOne, Frequently Asked Questions, 2005, 4 pgs.
VersionOne, Simplify the rollout of Agile Development within Your Organization, 2007, 2 pgs.
VersionOne, Simplifying Software Delivery, 2006, 1 pg.
Xplanner how to notes, May 10, 2005, 9 pgs.
Yu, A Versatile Development Process for Small to Large Projects Using IBM CMVC, 1994, 9 pgs.
Holler, Office Action, U.S. Appl. No. 14/054,733, Oct. 24, 2014, 11 pgs.
Holler, Notice of Allowance, U.S. Appl. No. 14/054,733, Apr. 13, 2015, 10 pgs.
Holler, Office Action, U.S. Appl. No. 14/246,019, Jul. 20, 2015, 30 pgs.
Almand, Office Action, U.S. Appl. No. 14/220,096, Nov. 3, 2015, 9 pgs.
Almand, Final Office Action, U.S. Appl. No. 14/220,096, Jun. 7, 2016, 9 pgs.
Holler, Notice of Allowance, U.S. Appl. No. 12/101,089, Jul. 11, 2016, 13 pgs.
Holler, Notice of Allowance, U.S. Appl. No. 14/246,019, Nov. 16, 2015, 7 pgs.
Holler, Office Action, U.S. Appl. No. 14/288,317, Dec. 16, 2015, 8 pgs.
Holler, Final Office Action, U.S. Appl. No. 14/288,317, Jul. 29, 2016, 8 pgs.
Holler, Office Action, U.S. Appl. No. 14/848,271, Jun. 16, 2016, 6 pgs.
Jansen, "On the Influence of Test-Driven Development on Software Design," Proceedings of the 19th Conference on Software Engineering Education & Training (CSEET'06) 2006 IEEE, <http://ieeexplore.ieee.org/stamp/stamp.js?tp=&arnumber=1617340>, 8 pgs.

(56) References Cited

OTHER PUBLICATIONS

Kane, David, "Introducing Agile Development into Bioinformatics An Experience Report," 2003 IEEE, <http://ieee.org/stamp.jsp?tp+&arnumber+123146.>, 8 pgs.

Memmel, T., et al., Agile Methods and Visual Specification in Software Development A Chance to Ensure Universal Access, 2007 springer, pp. 454-462, downloaded from <http://link.springer.com/chapter/10.1007/978-3-540-73279-2_51>, 10 pgs.

Scacchi, Walt, Modeling Simulating and Enacting Complex Orgnizational Processes A Life Cycle Approach1, 1996 MIT, 21 pgs., <http//citeseerx.ist.psu.edu/viewdoc/download?doi=10.1.1.48.8110&rep=rep1&type=pdf>.

Trask, Bruce, "Using Model-Driven Engineering to Complement Software Product Line Enginering in Developing Software Defined Radion Components and Applications," OOPSLA'06, Oct. 22-26, Portland, Oregon, <http://dl.acm.org/citation.cfm?id=1176733>, 8 pgs.

Xie, Qing, Developing cost-effective Model-Based Techniques for GUI Testing, 2006 ACM, pp. 997-1000, <http://dl.acm.org/citation.cfm?id+1134473>, 4 pgs.

* cited by examiner

MULTIPLE DISPLAY MODES FOR A PANE IN A GRAPHICAL USER INTERFACE

RELATED APPLICATIONS

This application is a continuation of U.S. patent application Ser. No. 12/247,963, filed Oct. 8, 2008, which is hereby incorporated by reference in its entirety.

TECHNICAL FIELD

The disclosed embodiments relate generally to graphical user interfaces, and more particularly, to multiple display modes for a pane in a graphical user interface.

BACKGROUND

Graphical user interfaces can provide an effect way for users to interact with a software application executed by a computer or computer-controlled device. However, designing graphical user interfaces that allow users to interact with an application in an intuitive manner presents significant challenges. Accordingly, there is a need for elegant graphical user interface designs.

SUMMARY

Methods, systems, and non-transitory computer readable storage mediums for providing multiple display modes for a pane in a graphical user interface are disclosed.

Computer-implemented methods for displaying a pane in a user interface are provided. In some implementations, a method includes: in a first display mode, displaying the pane in the user interface, wherein display of the pane persists regardless of a position of a pointer icon in the user interface; and ceasing to display the pane in response to detecting selection of an indicator. In some implementations, the method also includes: in a second display mode, displaying the pane in the user interface, wherein display of the pane persists while the pointer icon is positioned over the indicator or within the perimeter of the pane; and ceasing to display the pane in response to detecting that the pointer icon is no longer positioned over the indicator or within the perimeter of the pane.

In some implementations, the user interface comprises content distinct from the pane, and the method further includes: in the first display mode, displaying the pane adjacent to the content; and in the second display mode, displaying the pane superimposed on the content.

In some implementations, the content comprises a block of content, and the method also includes: in the first display mode, displaying the pane adjacent to the block of content; and in the second display mode, displaying the pane superimposed on the block of content.

In some implementations, the method also includes: activating the first display mode in response to detecting selection of an indicator corresponding to the pane; and activating the second display mode in response to detecting positioning of the pointer icon over the indicator corresponding to the pane, without detecting selection of the indicator.

In some implementations, the method also includes: transitioning from the second display mode to the first display mode in response to detecting selection of the indicator while in the second display mode.

In some implementations, the method also includes: transitioning from the first display mode into the second display mode, or from the second display mode into the first display mode, in a particular sequence.

In some implementations, the indicator comprises an icon.

In some implementations, the indicator is situated at a location along the perimeter of the user interface.

In some implementations, the user interface displays a list of items distinct from the pane; and the pane comprises a user input field to filter items displayed in the list.

In some implementations, the items in the list of items comprise work items in an agile software development project.

In some implementations, the pane includes one or more links to one or more respective portions of the user interface.

Computer systems for displaying a pane in a user interface are also provided. In some implementations, a computer system for displaying a pane in a user interface includes: memory; a display; one or more processors; and one or more programs stored in the memory and configured for execution by the one or more processors.

In some implementations, the one or more programs comprise instructions for: in a first display mode, displaying the pane in the user interface, wherein display of the pane persists regardless of a position of a pointer icon in the user interface; and ceasing to display the pane in response to detecting selection of an indicator. In some implementations, the one or more programs also include instructions for: in a second display mode, displaying the pane in the user interface, wherein display of the pane persists while the pointer icon is positioned over the indicator or within the perimeter of the pane; and ceasing to display the pane in response to detecting that the pointer icon is no longer positioned over the indicator or within the perimeter of the pane.

In some implementations, the user interface comprises content distinct from the pane, and the one or more programs further include instructions for: in the first display mode, displaying the pane adjacent to the content; and in the second display mode, displaying the pane superimposed on the content.

In some implementations, the content comprises a block of content, and the method also includes: in the first display mode, displaying the pane adjacent to the block of content; and in the second display mode, displaying the pane superimposed on the block of content.

In some implementations, the one or more programs further include instructions for: activating the first display mode in response to detecting selection of an indicator corresponding to the pane; and activating the second display mode in response to detecting positioning of the pointer icon over the indicator corresponding to the pane, without detecting selection of the indicator.

In some implementations, the one or more programs further include instructions for: transitioning from the second display mode to the first display mode in response to detecting selection of the indicator while in the second display mode.

In some implementations, the one or more programs further include instructions for: transitioning from the first display mode into the second display mode, or from the second display mode into the first display mode, in a particular sequence.

In some implementations, the indicator comprises an icon.

In some implementations, the indicator is situated at a location along the perimeter of the user interface.

In some implementations, the user interface displays a list of items distinct from the pane; and the pane comprises a user input field to filter items displayed in the list.

In some implementations, the items in the list of items comprise work items in an agile software development project.

In some implementations, the pane includes one or more links to one or more respective portions of the user interface.

Non-transitory computer readable storage mediums for displaying a pane in a user interface are provided. In some implementations, a non-transitory computer readable storage medium stores one or more programs configured to be executed by a computer system. In some implementations, the one or more programs comprise instructions for: in a first display mode, displaying the pane in the user interface, wherein display of the pane persists regardless of a position of a pointer icon in the user interface; and ceasing to display the pane in response to detecting selection of an indicator. In some implementations, the one or more programs also include instructions for: in a second display mode, displaying the pane in the user interface, wherein display of the pane persists while the pointer icon is positioned over the indicator or within the perimeter of the pane; and ceasing to display the pane in response to detecting that the pointer icon is no longer positioned over the indicator or within the perimeter of the pane.

In some implementations, the user interface comprises content distinct from the pane, and the one or more programs further include instructions for: in the first display mode, displaying the pane adjacent to the content; and in the second display mode, displaying the pane superimposed on the content.

In some implementations, the content comprises a block of content, and the method also includes: in the first display mode, displaying the pane adjacent to the block of content; and in the second display mode, displaying the pane superimposed on the block of content.

In some implementations, the one or more programs further include instructions for: activating the first display mode in response to detecting selection of an indicator corresponding to the pane; and activating the second display mode in response to detecting positioning of the pointer icon over the indicator corresponding to the pane, without detecting selection of the indicator.

In some implementations, the one or more programs further include instructions for: transitioning from the second display mode to the first display mode in response to detecting selection of the indicator while in the second display mode.

In some implementations, the one or more programs further include instructions for: transitioning from the first display mode into the second display mode, or from the second display mode into the first display mode, in a particular sequence.

In some implementations, the indicator comprises an icon.

In some implementations, the indicator is situated at a location along the perimeter of the user interface.

In some implementations, the user interface displays a list of items distinct from the pane; and the pane comprises a user input field to filter items displayed in the list.

In some implementations, the items in the list of items comprise work items in an agile software development project.

In some implementations, the pane includes one or more links to one or more respective portions of the user interface.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

Figure 1A:
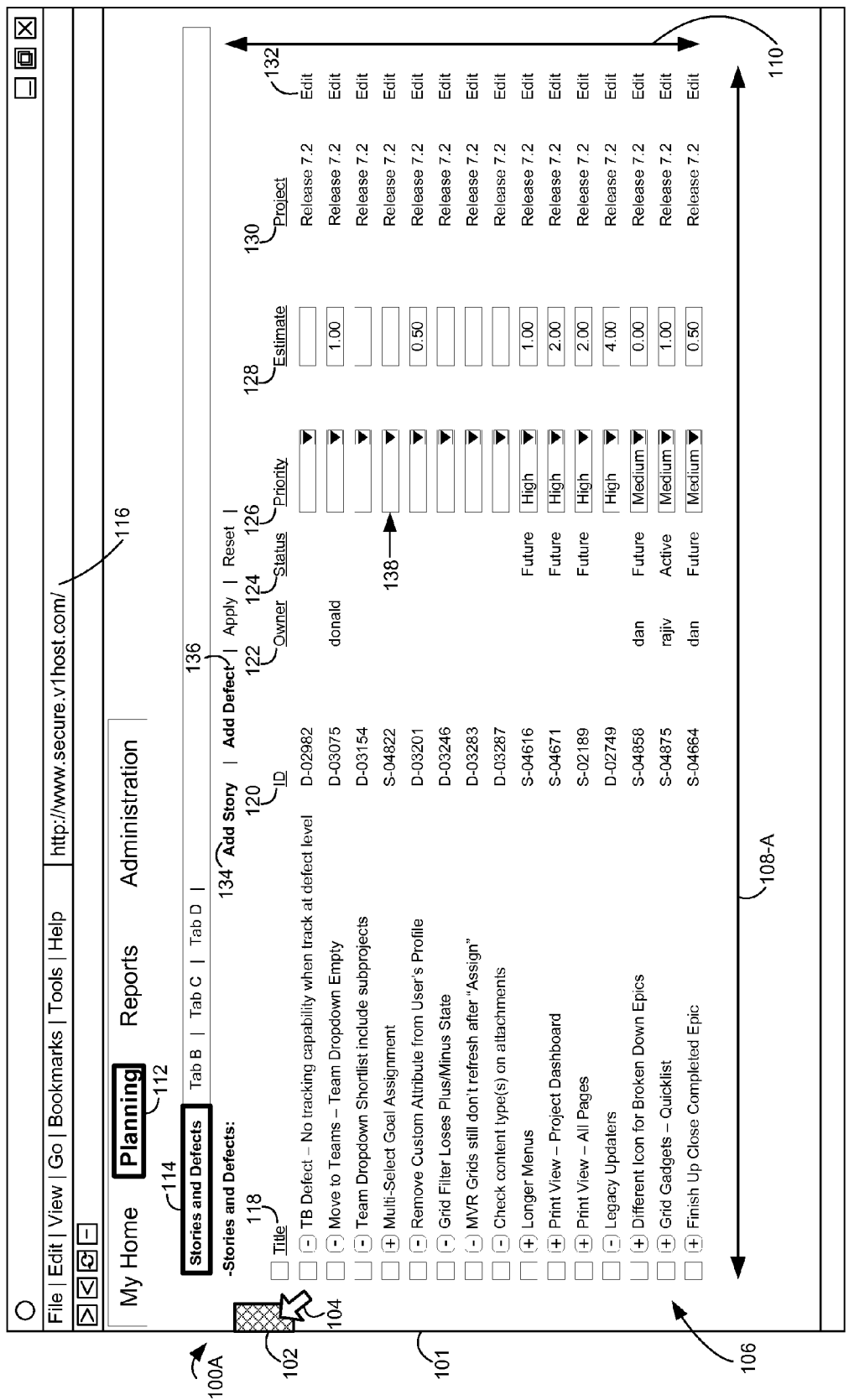
FIGS. 1A-1E are schematic screenshots of a graphical user interface in which a pane may be displayed in accordance with some embodiments.

FIG. 1A is a schematic screenshot of a graphical user interface (GUI) 100A in accordance with some embodiments. The GUI 100A displays content including a list 106 of items that have various attributes, such as a title 118, identification number 120, owner 122, status 124, priority 126, estimate 128 (e.g., an estimate of required work), and project 130. The list may include user input fields (e.g., 138) for editing attributes of various items in the list and may include links (e.g., 132) to other user interfaces for editing various items in the list, as well as links (e.g., 134 and 136) to user interfaces for adding items to the list 106. In some embodiments, the GUI 100A may be accessed by entering an appropriate URL in a URL input field 116 and/or by selecting appropriate tabs 112 and 114, selection boxes, radio button icons, drop-down menu items, or the like.

In some embodiments, the list is displayed in a rectangular block having a width 108-A and a height 110.

In some embodiments, the items in the list 106 include work items being tracked as part of a software development project, such as an agile software development project. For example, the list 106 may include features (i.e., stories) to be implemented in one or more iterations (i.e., sprints or timeboxes) of agile software development and may also include defects to be resolved in one or more iterations of agile software development. Alternatively, the contents of the list 106 may be arbitrary.

While the GUI 100A is shown as a web browser window displaying a list 106 of items, the disclosed embodiments are not so limited and instead may include any graphical user interface displaying arbitrary content.

Figure 1B:
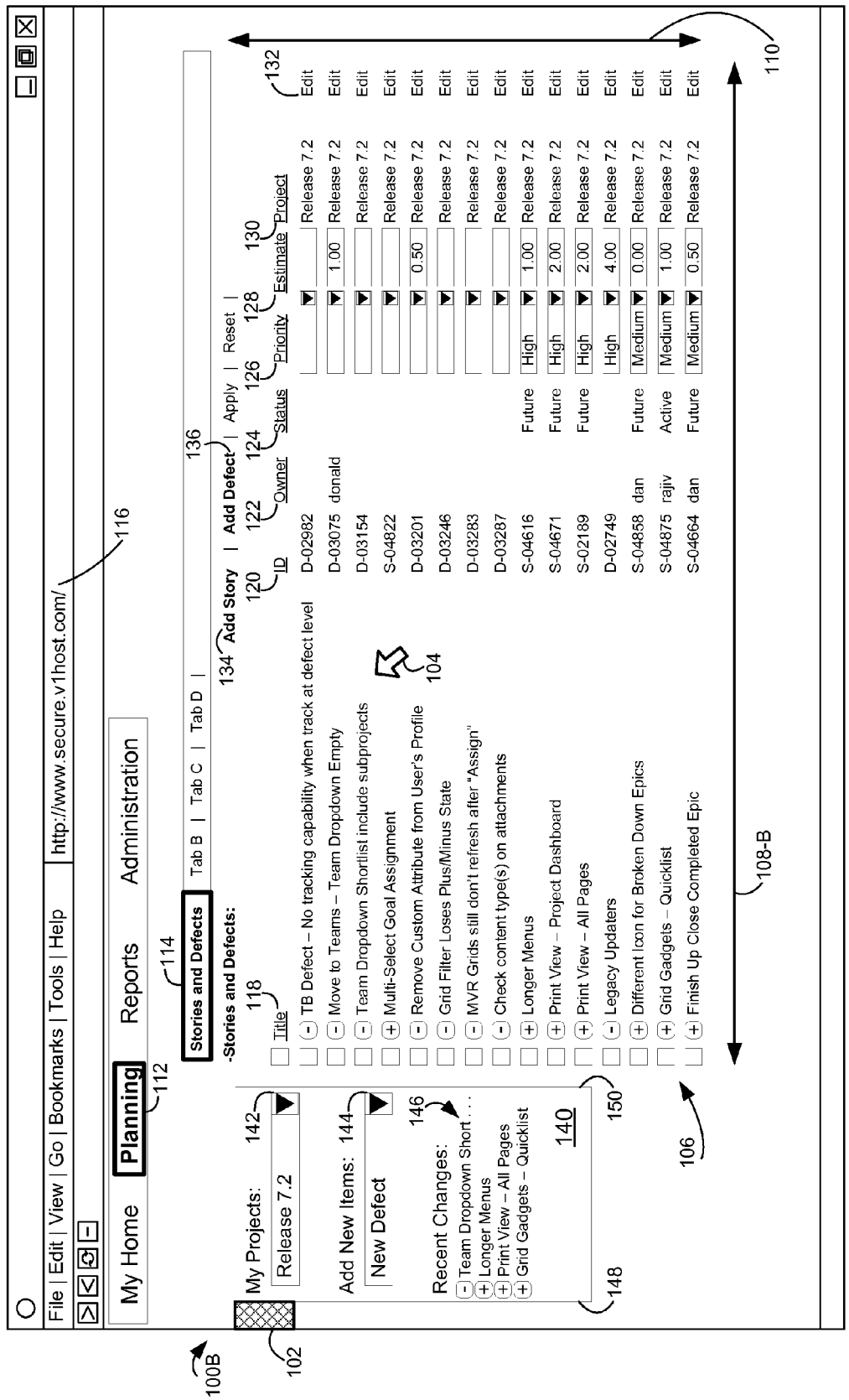

The GUI 100A also displays an icon 102 (or, alternatively, any appropriate indicator, such as a link) corresponding to a pane that is not currently displayed (e.g., the pane 140 shown in FIG. 1B). While the icon 102 is shown as being displayed adjacent to the perimeter 101 of the GUI 100A, the icon 102 may be situated anywhere within the GUI 100A. A user may cause the pane to be displayed by selecting the icon 102. For example, the user may position a pointer icon 104 over the icon 102 and click on the icon 102 using a selection device such as a mouse, trackball, touchpad, or the like. In response, the pane 140 is displayed, as shown in the GUI 100B (FIG. 1B) in accordance with some embodiments. In some embodiments, when the pane 140 is displayed in response to selection of the icon 102, display of other content such as the list 106 is adjusted to accommodate display of the pane 140. For example, in the GUI 100B the width 108-B of the list 106 has been decreased with respect to the width 108-A in the GUI 100A (FIG. 1A) to make room for the pane 140. The pane 140 is displayed with a first side 148 adjacent to the icon 102 and a second, opposite side 150 adjacent to the list 106.

Once the icon 102 has been selected (e.g., by clicking on the icon 102), display of the pane 140 persists regardless of where the pointer icon 104 is positioned in the GUI 100B. For example, as shown in FIG. 1B, the pane 140 is still displayed even though the pointer icon 104 is not positioned over the icon 102 or the pane 140.

In some embodiments, the pane 140 includes various options for modifying content displayed elsewhere in the GUI 100B, such as in the list 106. For example, the user may specify a project from a drop-down menu 142; in response, the list 106 is updated to display items associated with the selected project. Items not associated with the selected project thus are filtered out of the list 106. The user may add a new item to the list 106 by selecting a type of item from a drop-down menu 144; in response, a user interface (not shown) for specifying attributes of the new item is displayed and the new item is added to the list 106 once its attributes have been defined. The pane 140 also includes a list 146 of recently edited items from the list 106. In general, however, the contents of the pane 140 are arbitrary and may or may not be related to other content in the GUI 100B, such as the list 106.

If the user no longer desires to view the pane 140, the user may close the pane 140 by selecting the icon 102 (e.g., by clicking on the icon 102), or alternatively by selecting a separate close-pane icon (not shown) in the pane 140. In response, the displayed user interface reverts to the GUI 100A (FIG. 1A), with the list 106 reflecting any changes made to it.

Figure 1C:
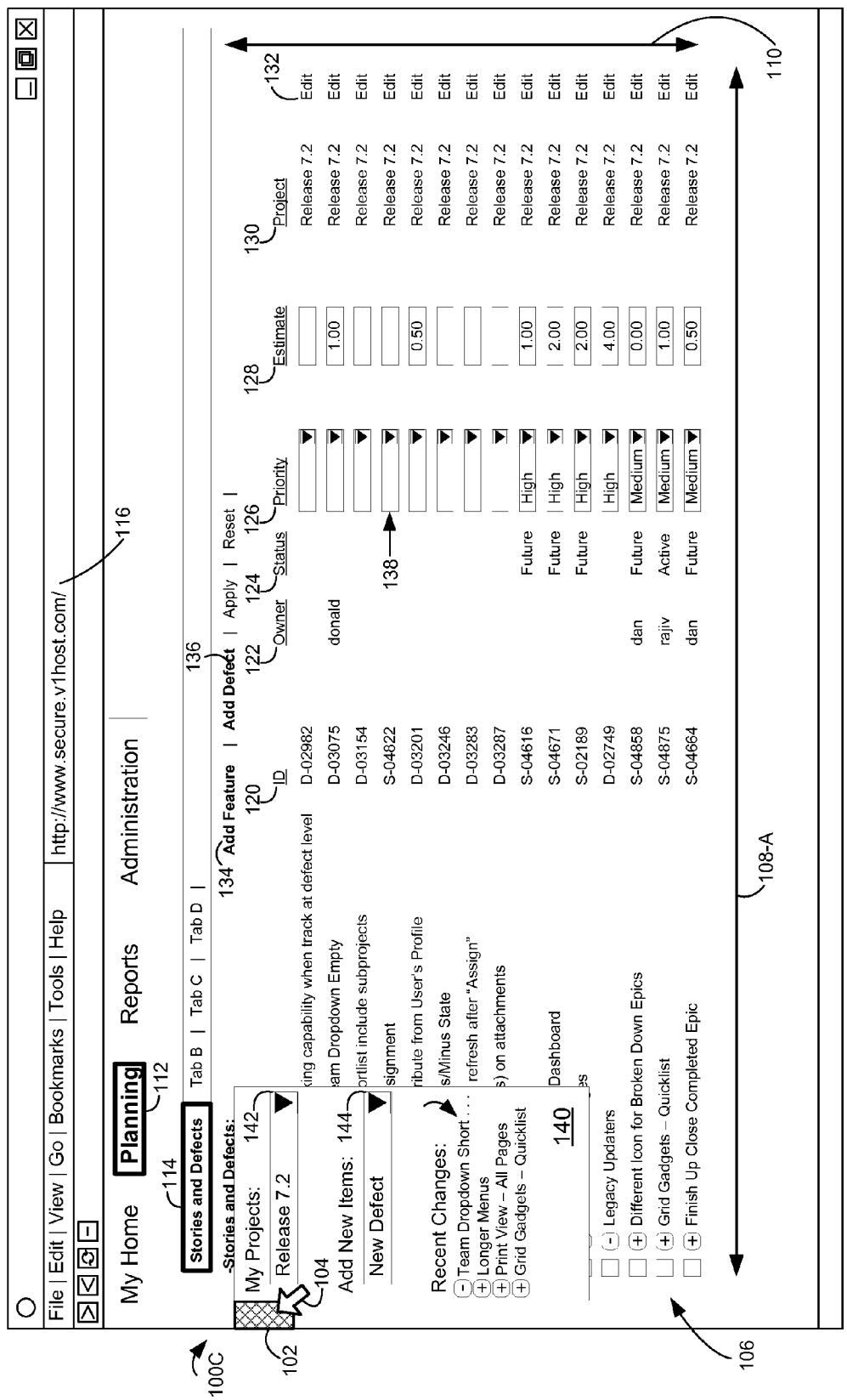

Instead of causing the pane 140 to be displayed by selecting the icon 102 (e.g., by clicking on the icon 102), a user interacting with the GUI 100A (FIG. 1A) may cause the pane 140 to be displayed by positioning the pointer icon 104 over the icon 102 but not clicking on the icon 102 or otherwise selecting the icon 102. For example, the user may use a mouse to position the pointer icon 104 over the icon 102, a process referred to as mousing over the icon 102. In response, the pane 140 is displayed as illustrated in the UI 100C (FIG. 1C). Display of the pane 140 persists as long as the pointer icon 104 remains positioned over the icon 102, as shown in FIG. 1C, or over the pane 140, as shown in the UI 100D of FIG. 1D. In other words, display of the pane 140 persists while the pointer icon 104 remains positioned over an area defined by the combination of the icon 102 and the pane 140. If the pointer icon 104 is moved so that it is no longer positioned over the icon 102 or pane 140, however, display of the pane 140 ceases, as illustrated in the UI 100E (FIG. 1E) in accordance with some embodiments.

In the GUI 100C and 100D (FIGS. 1C and 1D), the pane 140 is superimposed over the list 106, such that the list 106 has the same width 108-A as in the GUI 100A (FIG. 1A) but a portion of the list 106 is not visible because the pane 140 is displayed on top of it.

While the GUI 100C (FIG. 1C) is displayed, the user may select the icon 102, for example by clicking on it. In response, the GUI 100C is replaced with the GUI 100B (FIG. 1B): the width of the list 106 is adjusted from a first value 108-A (FIG. 1C) to a second, lower value 108-B (FIG. 1B), thereby creating space for the pane 140, which is now displayed adjacent to the list 106 instead of superimposed on the list 106. Display of the pane 140 will now persist, regardless of where the pointer icon 104 is subsequently positioned, until the user again selects the icon 102.

In some embodiments, the pane 140 is always superimposed on other content (e.g., the list 106), regardless of the user input that resulted in display of the pane 140. In some other embodiments, the pane 140 is always displayed adjacent to other content (e.g., the list 106), regardless of the user input that resulted in display of the pane 140. In yet other embodiments, the pane 140 is superimposed on other content in response to selection of the icon 102 and is displayed adjacent to other content in response to positioning of the pointer icon 104 over the icon 102 without selecting the icon 102. In some embodiments in which the pane is superimposed on other content, the pane may be displayed in a semi-transparent manner such that the other content is at least partially visible.

In some embodiments, the user may resize the pane 140, for example by clicking and dragging a side or corner of the pane 140.

In some embodiments, one or more shortcut keys are used to initiate display of the pane 140 in the UI 100B (FIG. 1B). In some embodiments, one or more shortcut keys are used to initiate display of the pane 140 in the UI 100C (FIG. 1C). In some embodiments, one or more shortcut keys may be used to cease display of the pane, as an alternative to selecting the icon 102 or to moving the pointer icon 104 outside of the area defined by the icon 102 and pane 140.

Figure 1D:
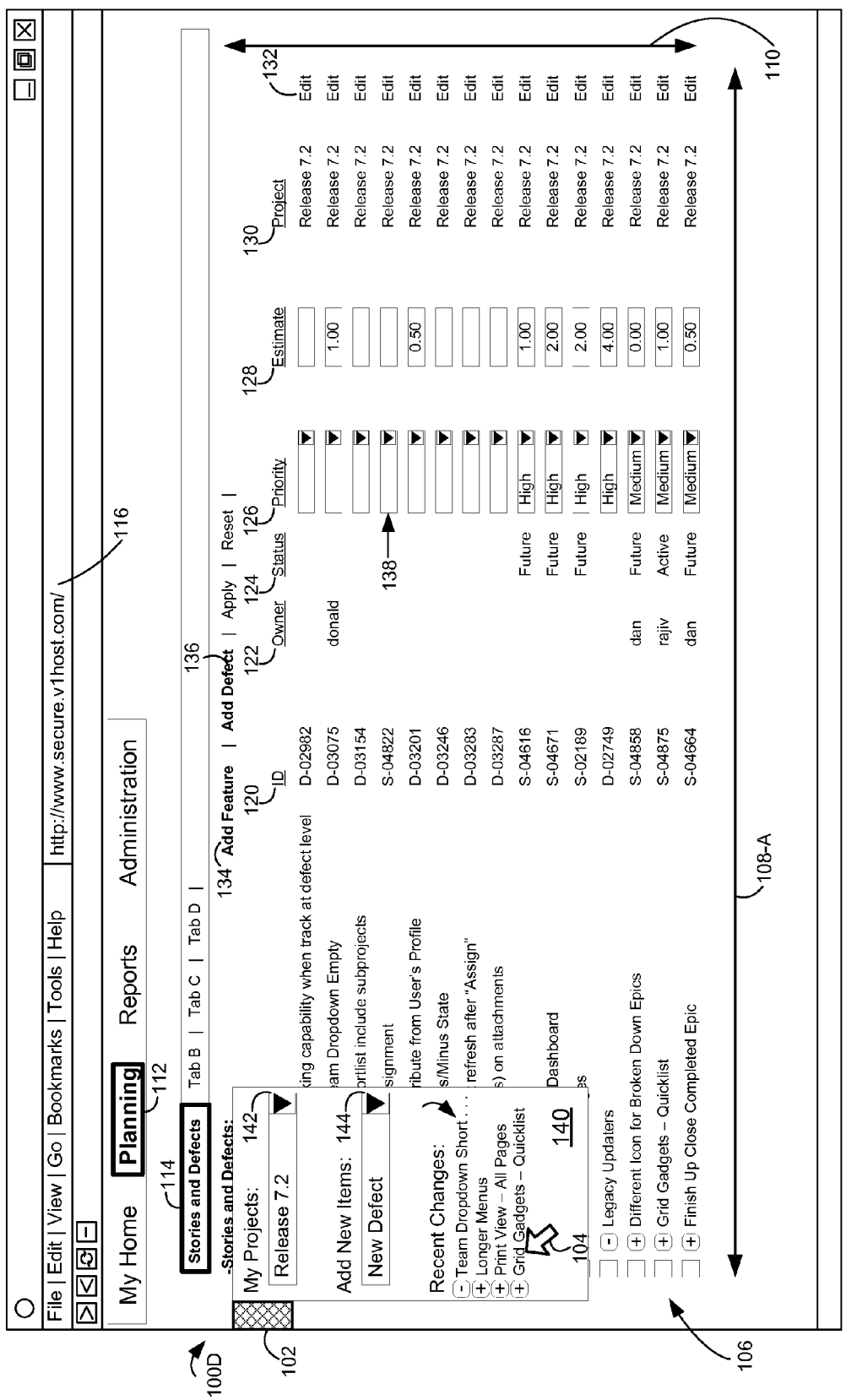
Figure 2A:
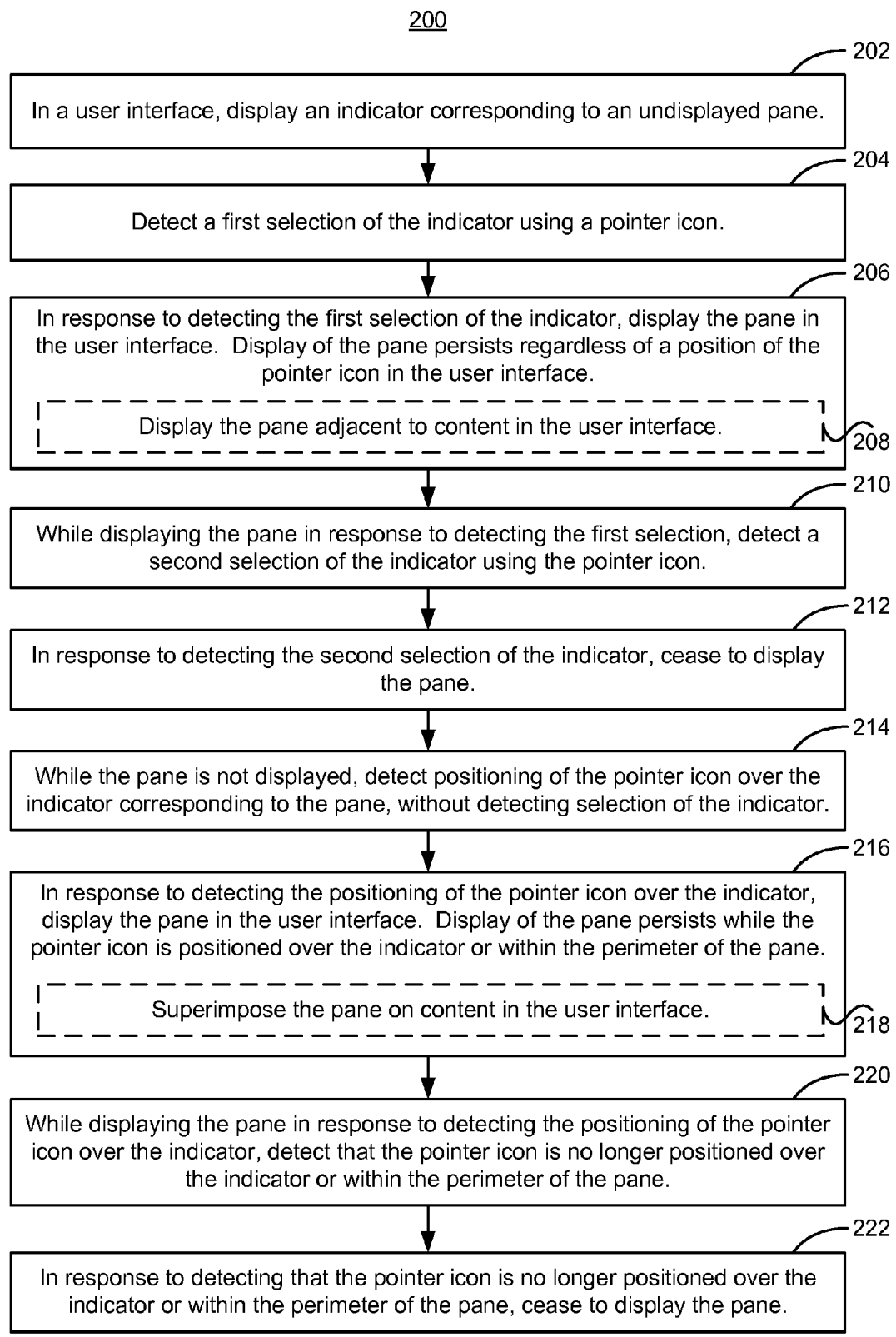
FIGS. 2A-2B are flow diagrams illustrating computer-implemented methods of displaying a pane in a user interface in accordance with some embodiments.
Figure 3:
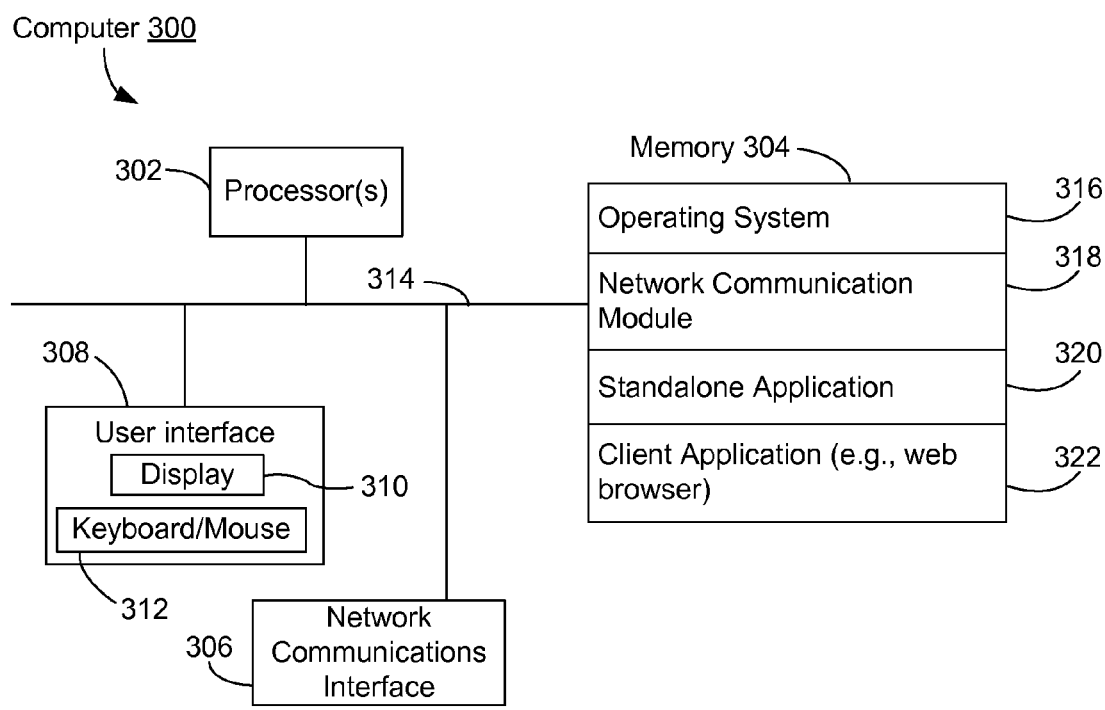
FIG. 3 is a block diagram illustrating a computer in accordance with some embodiments.

FIG. 2A is a flow diagram illustrating a computer-implemented method 200 of displaying a pane (e.g., pane 140, FIGS. 1B-1D) in a user interface in accordance with some embodiments. In some embodiments, the method 200 is performed on a computer system such as the computer 300 (FIG. 3).

In a user interface (e.g., UI 100A, FIG. 1), an indicator is displayed (202) corresponding to an undisplayed pane. In some embodiments, the indicator comprises an icon (e.g., icon 102, FIG. 1A). In some embodiments, the indicator is situated at a location along the perimeter (e.g., perimeter 101, FIG. 1A) of the user interface. In some embodiments, the user interface comprises content distinct from the pane, such as a block of content (e.g., the list 106, FIG. 1A) distinct from the pane.

A first selection of the indicator using a pointer icon (e.g., pointer icon 104, FIG. 1A) is detected (204). In some embodiments, the first selection corresponds to clicking on the indicator with a pointing device while positioning the pointer icon over the indicator with the pointing device.

In response to detecting the first selection of the indicator, the pane is displayed (206) in the user interface (e.g., as shown in the GUI 100B, FIG. 1B). Display of the pane persists regardless of a position of the pointer icon in the user interface. In some embodiments, the pane is displayed (208) adjacent to content in the user interface, such as the block of content in the user interface (e.g., adjacent to the list 106, FIG. 1B).

While displaying the pane in response to detecting the first selection, a second selection of the indicator using the pointer icon is detected (210). In some embodiments, the second selection corresponds to clicking on the indicator with a pointing device while positioning the pointer icon over the indicator with the pointing device. In response to detecting the second selection of the indicator, display of the pane is ceased (212) (e.g., as shown in the GUI 100A, FIG. 1A).

While the pane is not displayed, positioning of the pointer icon over the indicator corresponding to the pane is detected (214), without detecting selection of the indicator. In some embodiments, the positioning of the pointer icon over the indicator corresponds to mousing over the indicator or otherwise positioning the pointer icon over the indicator using a pointing device. In response to detecting the positioning of the pointer icon over the indicator, the pane is displayed (216) in the user interface (e.g., as shown in the GUI 100C, FIG. 1C). Display of the pane persists while the pointer icon is positioned over the indicator (e.g., as shown in the GUI 100C, FIG. 1C) or within the perimeter of the pane (e.g., as shown in the GUI 100D, FIG. 1D). In some embodiments, the pane is superimposed (218) on content in the user interface, such as the block of content.

While displaying the pane in response to detecting the positioning of the pointer icon over the indicator, it is detected (220) that the pointer icon is no longer positioned over the indicator or within the perimeter of the pane. In response to detecting that the pointer icon is no longer positioned over the indicator or within the perimeter of the pane, display of the pane is ceased (222) (e.g., as shown in the UI 100E, FIG. 1E).

In some embodiments, when the pane is not displayed (e.g., in operations 202, 212, and 222), content such as the block of content is displayed adjacent to the indicator. For example, in the GUI 100A (FIG. 1A), the icon 102 is displayed adjacent to the list 106. In some embodiments, in response to the first selection of the indicator, the pane is displayed such that a first side of the pane is adjacent to the indicator and a second side of the pane (e.g., opposite to the first side) is adjacent to the block of content. For example, in the GUI 100B (FIG. 1B), a first side 148 of the pane is adjacent to the icon 102 and a second, opposite side 150 is adjacent to the list 106.

In some embodiments, the block of content has first and second dimensions that have respective first and second values (e.g., width 108-A and height 110, FIG. 1A) when the pane is not displayed. In response to the first selection of the indicator, the first dimension of the block of content is reduced to a value (e.g., width 108-B, FIG. 1B) less than the first value and the pane (e.g., pane 140, FIG. 1B) is displayed adjacent to the block of content (e.g., list 106, FIG. 1B). In response to the second selection of the indicator, the first dimension of the block is restored to the first value (e.g., width 108-A, FIG. 1A). In some embodiments, in response to the positioning of the pointer icon over the indicator, the pane (e.g., pane 140, FIG. 1C) is superimposed on the block of content (e.g., list 106, FIG. 1C), wherein the first dimension of the block (e.g., width 108-A, FIG. 1C) remains at the first value.

In some embodiments, the pane enables users to modify the content displayed outside of the pane in the user interface or to navigate within the user interface. For example, in some embodiments the pane includes links to various portions of the user interface. In some embodiments, the pane includes a user input field (e.g., drop-down menu 142, FIGS. 1B-1D) to filter displayed content in the block of content. In some embodiments, the block of content includes a list of items (e.g., list 106, FIGS. 1A-1E) and the pane includes a user input field (e.g., drop-down menus 142 or 144, FIGS. 1B-1D) to modify the list of items. In some embodiments, the block of content includes a list of items and the pane includes a link (e.g., a link accessible through the drop-down menu 144, FIGS. 1B-1D) to a user interface to add an item to the list of items. In some embodiments, the block of content includes a list of items and the pane includes a list of recent changes to the list of items (e.g., list 146, FIGS. 1B-1D). In some embodiments, the pane includes a user input field for selecting one or more attributes of displayed items in the user interface, in response to which the selected attributes are highlighted for the displayed items. In some embodiments, the pane displays or provides access to help text with instructions for interacting with the user interface or with a software application corresponding to the user interface. In some embodiments, the pane includes a user input field for receiving and storing text.

In some embodiments, contents of the pane are user-defined or user-customized. For example, a separate configuration screen (not shown) could enable the user to specify the contents of the pane.

In some embodiments, the user interface displays a list of items distinct from the pane (e.g., list 106, FIGS. 1A-1E), and the pane includes a user input field to filter items displayed in the list (e.g., drop-down menu 142, FIGS. 1B-1D). In some embodiments, the items in the list include work items in an agile software development project.

The method 200 thus provides a user-friendly method of displaying a pane in a user interface. By varying the mode in which the pane is displayed in response to various user inputs, the method 200 provides an intuitive user experience that cannot be achieved with a single mode of display. While the method 200 includes a number of operations that appear to occur in a specific order, it should be apparent that the method 200 can include more or fewer operations, which can be executed serially or in parallel. An order of two or more operations may be changed and two or more operations may be combined into a single operation. For example, operations 214-222 may be performed prior to operations 204-212.

Figure 2B:
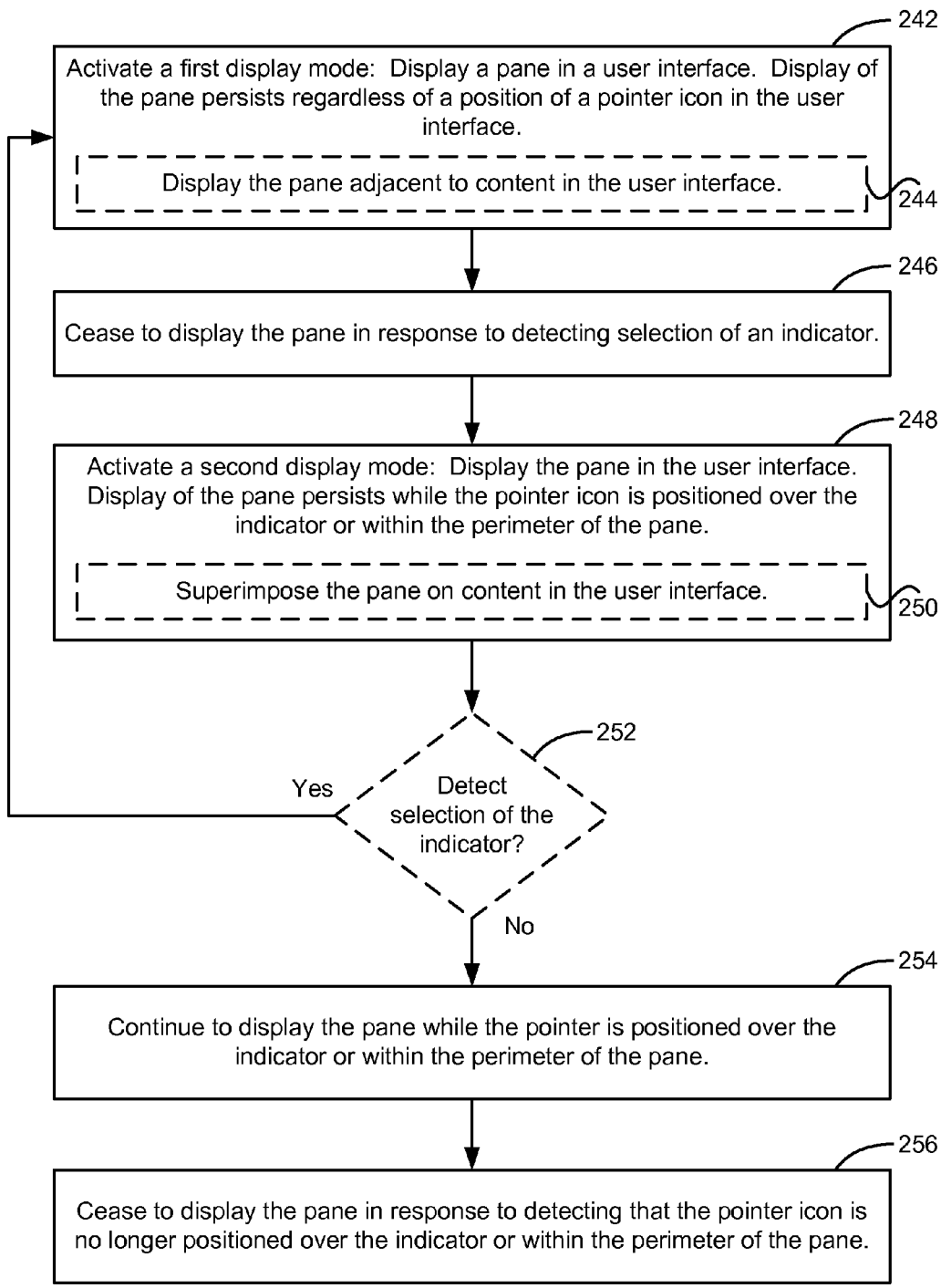

FIG. 2B is a flow diagram illustrating a computer-implemented method 240 of displaying a pane (e.g., pane 140, FIGS. 1B-1D) in a user interface in accordance with some embodiments. In some embodiments, the method 240 is performed on a computer system such as the computer 300 (FIG. 3). The method 240 involves two distinct display modes for displaying a pane in a user interface.

The first display mode is activated (242) and the pane is displayed in the user interface (e.g., UI 100B, FIG. 1B). In the first display mode, display of the pane persists regardless of a position of a pointer icon (e.g., pointer icon 104, FIG. 1B) in the user interface.

In some embodiments, the first display mode is activated in response to detecting selection of an indicator (e.g., indicator 102, FIGS. 1A-1E) corresponding to the pane. In some embodiments, in the first display mode the pane is displayed (244) adjacent to a content, such as a block of content (e.g., list 106, FIG. 1B), in the user interface.

In response to detecting selection of the indicator while the first display mode is active, display of the pane is ceased (246) (e.g., as shown in the UI 100A, FIG. 1A). Selection of the indicator thus terminates the first display mode.

The second display mode is activated (248) and the pane is displayed in the user interface. In the second display mode, display of the pane persists while the pointer icon is positioned over the indicator (e.g., as shown in the UI 100C, FIG. 1C) or within the perimeter of the pane (e.g., as shown in the UI 100D, FIG. 1D).

In some embodiments, the second display mode is activated in response to detecting positioning of the pointer icon over the indicator corresponding to the pane, without detecting selection of the indicator. In some embodiments, in the second display mode the pane is superimposed (250) on content in the user interface, such as the block of content (e.g., as shown in UI 100C and 100D, FIGS. 1C and 1D).

In some embodiments, while in the second display mode, a transition is made to the first display mode in response to detecting selection of the indicator (252—Yes). After this transition to the first display mode, display of the pane persists regardless of a position of the pointer icon in the user interface, as described for operation 242 (e.g., as shown in the UI 100B, FIG. 1B). Alternatively, if selection of the indicator is not detected (252—No), the second display mode remains active and display of the pane continues (254) while the pointer is positioned over the indicator or within the perimeter of the pane.

Figure 1E:
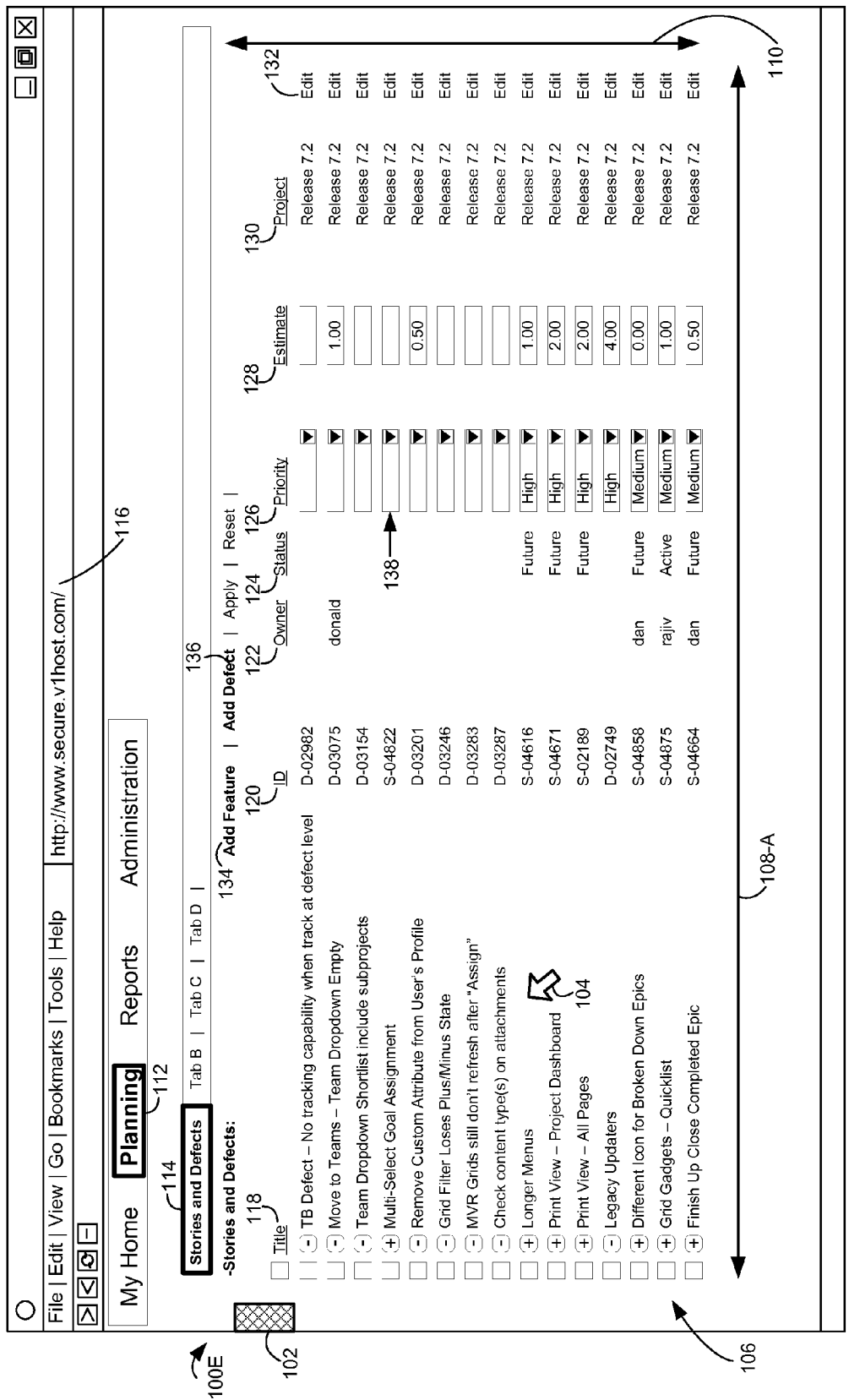

Display of the pane is ceased (256) in response to detecting that the pointer icon is no longer positioned over the indicator or within the perimeter of the pane (e.g., as shown in the UI 100E, FIG. 1E).

The method 240, like the method 200 (FIG. 2A), thus provides a user-friendly and intuitive method of displaying a pane in multiple modes depending on user inputs. While the method 240 includes a number of operations that appear to occur in a specific order, it should be apparent that the method 240 can include more or fewer operations, which can be executed serially or in parallel. An order of two or more operations may be changed and two or more operations may be combined into a single operation. For example, operations 248-256, which correspond to the second display mode, may be performed prior to operations 242-248, which correspond to the first display mode. In some embodiments, each of the two display modes may be accessed independently by the user. For example, the user may initiate activation of the first display mode (242) or second display mode (248) through interaction with a GUI in accordance with some embodiments.

FIG. 3 is a block diagram illustrating a computer or computer controlled device 300, such as a personal digital assistant (PDA), cellular telephone or the like, in accordance with some embodiments. The computer 300 typically includes one or more processors 302, one or more network or other communications interfaces 306, memory 304, and one or more communication buses 314 for interconnecting these components. The communication buses 314 may include circuitry (sometimes called a chipset) that interconnects and controls communications between system components. The client computer 300 may also include user interface hardware 308 comprising a display device 310 and a keyboard and/or mouse (or other pointing device such as a trackball or touchpad) 312. Memory 304 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the processor(s) 302. Memory 304, or alternately non-volatile memory device(s) within memory 304, comprises a computer readable storage medium. In some embodiments, memory 304 stores the following programs, modules, and data structures, or a subset thereof:

- an operating system 316 that includes procedures for handling various basic system services and for performing hardware dependent tasks;
- a network communication module 318 that is used for connecting the client computer 300 to other computers via the one or more communication network interfaces 306 and one or more communication networks, such as the Internet, other wide area networks, local area networks, metropolitan area networks, and so on;
- a standalone application 320 that renders a graphical user interface when executed; and
- a web browser or other client application 322 that renders a graphical user interface when executed.

In some embodiments, the standalone application 320 and/or client application 322 includes instructions for performing the methods 200 (FIG. 2A) and/or 240 (FIG. 2B).

In some embodiments, rendering of a graphical user interface by a client application 322 is performed in accordance with a script-based module embedded in a web page served from a server system. The script-based module may be written in JavaScript, AJAX, ECMAScript, Perl, or any other suitable scripting language. The web pages may be written in the Hypertext Markup Language (HTML), Extensible Markup Language (XML), or any other suitable language for preparing web pages.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 304 may store a subset of the modules and data structures identified above. Furthermore, memory 304 may store additional modules and data structures not described above.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

What is claimed is:

1. A computer-implemented method of displaying a pane in a user interface, the user interface comprising a block of content distinct from the pane, comprising:
    while the pane is not displayed, displaying the block of content, wherein the block of content has a first dimension and a second dimension; in a first display mode:
    reducing the first dimension and maintaining the second dimension; displaying the pane in the user interface adjacent to the block of content having the reduced first dimension, wherein display of the pane persists regardless of a position of a pointer icon in the user interface; and
    ceasing to display the pane in response to detecting selection of an indicator; and
    in a second display mode:
    maintaining the first dimension and the second dimension; displaying the pane in the user interface superimposed on the block of content having the maintained first dimension, wherein display of the pane persists while the pointer icon is positioned over the indicator or within the perimeter of the pane; and
    ceasing to display the pane in response to detecting that the pointer icon is no longer positioned over the indicator or within the perimeter of the pane.

2. The method of claim 1, further comprising:
    activating the first display mode in response to detecting selection of an indicator corresponding to the pane; and activating the second display mode in response to detecting positioning of the pointer icon over the indicator corresponding to the pane, without detecting selection of the indicator.

3. The method of claim 1, further comprising:
transitioning from the second display mode to the first display mode in response to detecting selection of the indicator while in the second display mode.

4. The method of claim 1, further comprising:
transitioning from the first display mode into the second display mode, or from the second display mode into the first display mode, in a particular sequence.

5. The method of claim 1, wherein the indicator comprises an icon.

6. The method of claim 1, wherein the indicator is situated at a location along the perimeter of the user interface.

7. The method of claim 1, wherein:
the user interface displays a list of items distinct from the pane; and the pane comprises a user input field to filter items displayed in the list.

8. The method of claim 7, wherein the items in the list of items comprise work items in an agile software development project.

9. The method of claim 1, wherein the pane includes one or more links to one or more respective portions of the user interface.

10. A computer system comprising:
memory;
a display;
one or more processors; and
one or more programs stored in the memory and configured for execution by the one or more processors, the one or more programs comprising instructions for:
while a pane is not displayed in a user interface comprising a block of content distinct from the pane, displaying the block of content, wherein the block of content has a first dimension and a second dimension; in a first display mode:
reducing the first dimension and maintaining the second dimension;
displaying the pane in the user interface adjacent to the block of content having the reduced first dimension, wherein display of the pane persists regardless of a position of a pointer icon in the user interface; and
ceasing to display the pane in response to detecting selection of an indicator; and
in a second display mode:
maintaining the first dimension and the second dimension; displaying the pane in the user interface superimposed on the block of content having the maintained first dimension, wherein display of the pane persists while the pointer icon is positioned over the indicator or within the perimeter of the pane; and
ceasing to display the pane in response to detecting that the pointer icon is no longer positioned over the indicator or within the perimeter of the pane.

11. The computer system of claim 10, wherein the one or more programs further comprising instructions for:
transitioning from the second display mode to the first display mode in response to detecting selection of the indicator while in the second display mode.

12. The computer system of claim 10, wherein the one or more programs further comprising instructions for:
transitioning from the first display mode into the second display mode, or from the second display mode into the first display mode, in a particular sequence.

13. The computer system of claim 10, wherein the indicator comprises an icon.

14. The computer system of claim 10, wherein the indicator is situated at a location along the perimeter of the user interface.

15. The computer system of claim 10, wherein: the user interface displays a list of items distinct from the pane; and
the pane comprises a user input field to filter items displayed in the list.

16. The computer system of claim 15, wherein the items in the list of items comprise work items in an agile software development project.

17. The computer system of claim 10, wherein the pane includes one or more links to one or more respective portions of the user interface.

18. A non-transitory computer readable storage medium storing one or more programs configured to be executed by a computer system, the one or more programs comprising instructions for:
while a pane is not displayed in a user interface comprising a block of content distinct from the pane, displaying the block of content, wherein the block of content has a first dimension and a second dimension; in a first display mode:
reducing the first dimension and maintaining the second dimension; displaying the pane in the user interface adjacent to the block of content having the reduced first dimension, wherein display of the pane persists regardless of a position of a pointer icon in the user interface; and
ceasing to display the pane in response to detecting selection of an indicator; and
in a second display mode:
maintaining the first dimension and the second dimension; displaying the pane in the user interface superimposed on the block of content having the maintained first dimension, wherein display of the pane persists while the pointer icon is positioned over the indicator or within the perimeter of the pane; and
ceasing to display the pane in response to detecting that the pointer icon is no longer positioned over the indicator or within the perimeter of the pane.

* * * * *